(12) United States Patent
Winkler

(10) Patent No.: US 10,182,148 B2
(45) Date of Patent: Jan. 15, 2019

(54) METHOD AND SYSTEM FOR FILTERING UNDESIRABLE INCOMING TELEPHONE CALLS

(71) Applicant: KATIA SA, Martigny (CH)

(72) Inventor: Maxime Winkler, Martigny (CH)

(73) Assignee: KATIA SA, Martigny (CH)

( * ) Notice: Subject to any disclaimer, the term of this patent is extended or adjusted under 35 U.S.C. 154(b) by 0 days.

(21) Appl. No.: 15/319,117

(22) PCT Filed: Jun. 18, 2015

(86) PCT No.: PCT/EP2015/063689
§ 371 (c)(1),
(2) Date: Dec. 15, 2016

(87) PCT Pub. No.: WO2015/193422
PCT Pub. Date: Dec. 23, 2015

(65) Prior Publication Data
US 2017/0134574 A1    May 11, 2017

(30) Foreign Application Priority Data

Jun. 18, 2014  (CH) ......................................... 925/14

(51) Int. Cl.
*H04M 3/436* (2006.01)
*H04M 3/42* (2006.01)
*H04L 29/06* (2006.01)
*G06N 99/00* (2010.01)

(52) U.S. Cl.
CPC .......... *H04M 3/436* (2013.01); *G06N 99/005* (2013.01); *H04L 63/0861* (2013.01); *H04L 63/10* (2013.01); *H04M 3/4211* (2013.01); *H04M 3/42059* (2013.01); *H04M 3/42102* (2013.01); *H04M 2201/41* (2013.01)

(58) Field of Classification Search
CPC . G06N 99/005; H04L 63/0861; H04M 3/436; H04M 3/42059; H04M 3/4211; H04M 2201/41
USPC ....................................................... 455/414.1
See application file for complete search history.

(56) References Cited

U.S. PATENT DOCUMENTS

| | | | |
|---|---|---|---|
| 5,930,700 A | 7/1999 | Pepper et al. | |
| 7,136,458 B1* | 11/2006 | Zellner | H04M 3/436 379/88.02 |
| 7,623,634 B2* | 11/2009 | Benco | H04M 3/385 379/142.06 |
| 7,852,993 B2* | 12/2010 | Ju | H04M 3/42042 379/88.02 |
| 8,472,599 B1 | 6/2013 | White | |

(Continued)

FOREIGN PATENT DOCUMENTS

| | | | |
|---|---|---|---|
| EP | 0 559 047 A1 | 9/1993 | |
| EP | 1 564 722 A1 | 8/2005 | |

(Continued)

OTHER PUBLICATIONS

International Search Report, dated Sep. 11, 2015, from corresponding PCT application.

*Primary Examiner* — William Nealon
(74) *Attorney, Agent, or Firm* — Young & Thompson

(57) ABSTRACT

Method of filtering undesirable incoming telephone calls, in which a decision to block a call or to transmit it is based both on the caller's number and on analysis of the caller's voice.

14 Claims, 3 Drawing Sheets

(56) References Cited

U.S. PATENT DOCUMENTS

| | | | |
|---|---|---|---|
| 8,548,149 B2 | 10/2013 | Czachor, Jr. et al. | |
| 2001/0012348 A1* | 8/2001 | Latter | H04M 1/57 379/142.06 |
| 2002/0018546 A1 | 2/2002 | Horne | |
| 2004/0086101 A1 | 5/2004 | Katz | |
| 2004/0131164 A1 | 7/2004 | Gould | |
| 2005/0180547 A1* | 8/2005 | Pascovici | G10L 17/04 379/88.01 |
| 2007/0165554 A1* | 7/2007 | Jefferson | H04M 3/42263 370/315 |
| 2008/0084975 A1* | 4/2008 | Schwartz | H04M 3/436 379/88.22 |
| 2008/0118042 A1* | 5/2008 | Hogg | H04M 3/2281 379/93.03 |
| 2008/0159488 A1* | 7/2008 | Raja | G10L 17/24 379/88.02 |
| 2008/0292085 A1 | 11/2008 | Pappas | |
| 2009/0238345 A1 | 9/2009 | Cha | |
| 2010/0278325 A1 | 11/2010 | Singh et al. | |
| 2013/0100238 A1* | 4/2013 | Wharton | G06K 9/00221 348/14.08 |

FOREIGN PATENT DOCUMENTS

| | | |
|---|---|---|
| EP | 2 153 637 A | 2/2010 |
| EP | 2 306 695 A1 | 4/2011 |
| GB | 2 443 871 A | 5/2008 |
| GB | 2 474 439 A | 4/2011 |
| JP | 2007336001 A | 12/2007 |
| JP | 2011/010078 A | 1/2011 |
| WO | 2007/118851 A1 | 10/2007 |
| WO | 2007/134810 A1 | 11/2007 |
| WO | 2007/144310 A1 | 12/2007 |
| WO | 2008/146265 A3 | 4/2008 |
| WO | 2011/014103 A1 | 2/2011 |

* cited by examiner

METHOD AND SYSTEM FOR FILTERING UNDESIRABLE INCOMING TELEPHONE CALLS

The present application claims priority of Swiss patent application CH0925/14, the contents of which is hereby enclosed by reference.

TECHNICAL FIELD

The invention concerns a process and a system for filtering unwanted incoming telephone calls, particularly a process and a system for detecting and preventing unwanted and criminal calls.

PRIOR ART

Today's telecommunication systems allow unwanted calls to be made easily, often with complete impunity. By way of example, many subscribers complain of receiving calls from advertizing campaigns or opinion polls. More serious, some calls may even be criminal, for example in the case of harassment, phone scamming, fraud or calls from pedophiles, for example.

There are many solutions in the prior art for blocking unwanted telephone calls.

US2008292085A describes an apparatus that allows telephone calls from a number featuring on a black list to be blocked. The called party is able to add numbers to his list. However, this apparatus provides no protection against unwanted calls from a number not on the black list, for example calls from a phone booth, or those whose calling party number has been falsified.

GB200614708A describes a device for filtering incoming calls that allows the user to program authorized calling party numbers and to block other calls. Users that do not feature on this list can enter an NIP code in order to be authorized to call. This device provides effective protection but runs the risk of creating a large number of "false positives", that is to say calls that are wrongly blocked even though they are not unwanted. Moreover, the obligation to input an NIP code is restricting for bona fide calling parties.

US2004131164 describes an apparatus that allows calls to be diverted to an answering machine when the calling party identifier features on a list.

U.S. Pat. No. 8,472,599 describes a device that allows incoming calls to be automatically rejected when the call identifier cannot be determined.

US2002018546A describes a call filtering device that can be programmed to define different rules depending on the time of day or for different calling parties.

US2004086101A describes a telephone call filtering system adapted particularly to faxes.

EP0559047 describes a telephone call filtering apparatus that can be used with a telephone receiver.

U.S. Pat. No. 8,548,149 describes a telephone receiver capable of detecting unwanted calls, particularly on the basis of call patterns and black lists of unwanted calling parties.

WO11014103 describes a telecommunication system capable of filtering calls in a telephone exchange. Calling parties can be identified by means of an identification code.

JP2011010078 describes another unwanted call filtering device that is based on black lists of unwanted calling parties.

US2010278325A describes a method that makes it possible to predict whether an incoming call will bother the called party, and to prevent such a call. The prediction is based on temporal characteristics of previous calls from the calling party.

EP2153637 describes a method for detecting unwanted telephone call campaigns, for example by analyzing the number of calls transmitted from each number. This method is difficult or impossible to apply from a subscriber location.

WO07144310A1 describes an incoming call management system that uses a black list, a white list and a gray list of calling parties.

JP2007336001 describes a method that makes it possible to interrupt an unwanted call by gradually impairing the quality of the call.

WO07134810 describes a process making it possible to determine the probability of an incoming call being unwanted, based on the time of arrival of the call.

WO07118851 describes a method involving the creation of a black list of calling parties that have made at least one unwanted call.

US2009238345A describes a system making it possible to block unwanted calls even before the first ring.

US2009238345A describes a device that makes it possible to add a telephone number to a black list or to a white list.

U.S. Pat. No. 5,930,700 describes a system for managing black and white lists from a PDA.

Most of these known solutions are therefore based primarily on the calling party identification, or sometimes on other parameters such as the time of call. None of these criteria provides adequate security, however.

The reason is that, at present, a person is able, without another, to call another person without, however, being authorized, identified or even authenticated. By way of example, most operators allow the calling party number to be concealed. Anyone can also use a public telephone booth or more simply make a VoIP (for example: Skype) call terminated on the network, so as not to reveal his identity. It is moreover possible to simply modify the calling party number; many private telephone exchanges provide this option.

Therefore, telephone numbers that are displayed are sometimes fanciful, or concealed, and do not really help called parties to make the right decision before lifting the receiver. Some telephone spammers even use calling party numbers corresponding to government organizations whose calls must on no account, or cannot legally, be blocked.

The prior art certainly discloses calling party identification methods that are based on a voice analysis, rather than on the calling party number. By way of example, EP1564722 describes a process for routing and screening telephone calls based on the voice and on the calling party number. This process allows more effective routing of calls in a call center, by courtesy of improved recognition of the calling party.

Voice recognition of the calling party has also been used for unwanted call filtering. GB2474439 concerns an apparatus for processing incoming telephone calls in order to route them to the called party or to reject them. The decision is taken on the basis of a calling party identification based on an ID, PIN, voice recognition, or on biometric information, for example. However, the document does not describe on what voice extract the voice recognition is based.

Identification by voice analysis must precede setup of the connection to the called party, and thus lengthens the setup phase for the call. For this reason, this relatively intrusive analysis is at the very most implemented in routing systems for call centers (as in EP1564722), since in these systems the calling party is generally asked to speak anyway in order to guide the routing. Compelling all calling parties to speak before the connection is set up would, by contrast, be considered to be unacceptable and intrusive in other situations.

BRIEF SUMMARY OF THE INVENTION

It is an aim of the present invention to propose a process and a method that allow the problems described above to be solved or in any case reduced.

In particular, one aim of the present invention is to more effectively control incoming telephone access in order to effectively filter unwanted calls.

It is an aim of the present invention to propose a process that is transparent and less intrusive for authorized calling parties accustomed to communicating with a particular user.

According to the invention, these aims are achieved particularly by means of a process for filtering unwanted incoming telephone calls, in which a decision to block a call or to transmit it is based both on the calling party number and on an analysis of the voice of the calling party, the process having the following steps:

a) determination of the calling party number;

b) on the basis of the calling party number, a filtering system decides either to transmit the call, or to reject the call, or to ask the calling party to speak;

e) when the calling party is asked to speak, he speaks without his voice message being reproduced for the called party;

f) the filtering system analyzes the voice of the calling party;

l) the filtering system takes this analysis as a basis for deciding whether the call needs to be transmitted to the called party, or whether it needs to be blocked.

This process therefore uses at least two indicators, one on the calling party number and the other that models the calling party himself by courtesy of an analysis of his voice.

This process therefore makes it possible to immediately block incoming calls that may with more or less absolute certainty be considered to be unwanted; this blocking can even be effected without the ringer of the called telephone ringing.

Conversely, the process is transparent for calls that are able, particularly on the basis of the calling party number, to be ruled out as being telephone spam.

Between the two, a special procedure is set up for calls that cannot easily be classified as unwanted or as desirable; in this gray area, the calling party is asked by the system to speak to the system in order to analyze his voice and to determine, on the basis of this voice, whether or not the call needs to be transmitted. The voice message of the calling party is preferably not transmitted to the called party during this test phase; it is even possible to automatically analyze the voice of the calling party before the telephone of the called party rings.

This process thus makes it possible to prevent calls of a criminal nature even before they reach their victims.

The process can comprise a semantic analysis of the conversation, the decision to transmit a call or the decision to block a call being dependent on this semantic analysis.

In one embodiment, a score describes the confidence that the system attributes to a call identifier, while a second measure checks that it is indeed the right person who is on the line by checking the biometric print, for example the voice print, the face print, the multimodal print (voice plus face), and possibly the semantic print of the calling party.

The analysis of the calling party number can use black lists, white lists and/or gray lists of calling parties, for example. These lists may be specific to each called party: the reason is that a given calling party will perhaps be unwanted for some called parties but not for others. Other black, white and/or gray lists can also be shared between multiple called parties, for example by storing them in a centralized manner in a shared server.

Synchronization mechanisms can be set up in order to synchronize shared lists with individual lists. In one embodiment, a calling party is placed on a shared black list, or white or gray list, as soon as a given number and/or percentage of called parties have classed said calling party as such.

The analysis of the calling party number can also be based on the plausibility of the calling party number, for example in order to block nonexistent calling party numbers or those whose format (for example the number of digits, the dialing code, etc.) does not correspond to an existent number structure.

The analysis of the calling party number can also be based on the geographical origin associated with the dialing code of the transmitted calling party number; for a given called party, calls from abroad, or from an area or country other than those with which he is accustomed to communicating, can be blocked or generate a request to speak before the call is transmitted.

The voice analysis of the voice of calling parties makes it possible to identify the person on the line and to recognize him on the basis of his voice print, for example. Thus, a known telephone spammer (for example an employee of a call center) can be recognized on the basis of his voice print even if he uses different calling party numbers. The voice prints of unwanted calling parties can be shared among multiple called parties.

Voice analysis also makes it possible to authenticate the calling party and to check that he corresponds to the transmitted calling party number when the print(s) associated with this calling party number is/are known, for example on the basis of previous calls.

Voice analysis also makes it possible to classify the calling party into a group among multiple groups, for example into a "blocked", "admitted", etc. group.

A speech recognition algorithm and a semantic analysis can be implemented in order to classify called parties and in order to reject unwanted calls or to accept desirable calls. By way of example, some terms or expressions frequently used by intruders, or by a specific calling party, can contribute to triggering a block or accept decision.

The speech recognition algorithm can also compare the words of the calling party with endogenous (for example content of previous dialogs with this calling party known to the system) or exogenous (for example data on a social network of the calling party or of the called party) data. This comparison can be used in order to classify the calling party and/or in order to authenticate him.

The filtering system therefore uses an identification of the calling party by courtesy of his voice. It can also use other information extracted from the sound signal received, including detection of beeps, or sound signals transmitted during calls from some call centers; detection of background music, including detection of particular pieces; recognition and classification of background noise; automatic detection of synthetic voice; detection of audio extracts that are already known; semantic recognition of spoken text; etc. By combining several of these parameters, it is possible to determine a probability or a score for unwanted call detection.

The filtering system can continue to analyze the voice of the calling party after the call has been transmitted to the called party. By way of example, this analysis makes it possible to specify the voice signature of authorized calling parties whose call has been transmitted, so as to better recognize them in the future. It is also possible to block the call or to propose that it be blocked when this analysis shows, after setup of the call to the called party, that it is unwanted, for example if it comes from an intruder recognized late in the discussion, or when the semantic analysis of his words shows an unacceptable content.

A confidence score can be attributed to the call on the basis of the calling party number, the decision to reject the call or to ask the calling party to speak being taken in the course of step b when this score is below a predetermined threshold.

This confidence score attributed to a calling party is determined independently for each called party. A calling party number that is well known to a given called party, and that has often telephoned him, will generate a higher confidence score than a calling party number that is new to this called party, for example. This individual confidence score may also be dependent on the individual white, black or gray lists specific to each called party along with shared lists.

A second confidence score can also be attributed to the call on the basis of biometric, for example voice, face, voice plus face, and/or semantic analysis. This second confidence score can be combined with the first confidence score.

The confidence score, and the decision to reject the call or to ask the calling party to speak, may be dependent on the history of calls made with said calling party number to other called parties. By way of example, a calling party number notoriously associated with troublesome calls may be mentioned in black lists of numbers that can be shared, or conversely a government agency number may feature on shared white lists. Furthermore, a calling party number associated with a very high number of calls perhaps comes from a call center, to which a lower confidence score will probably be attributed.

The process can comprise a step of identification of the calling party by courtesy of biometric analysis, the confidence score being dependent on the history of calls made by the calling party identified in this manner to other called parties. By way of example, a calling party notoriously associated with intrusive calls may be mentioned in calling party black lists that can be shared. Furthermore, a calling party associated with a very high number of calls perhaps works in a call center, to which a lower confidence score will probably be attributed.

The called party can preferably signal an unwanted call, for example by means of a button on an apparatus, a voice command or via a website. By way of example, this indication can be made during the call, or after this call. The calling party number can then be placed into a black list of the called party, or associated with a lower confidence score than originally. In the same way, the biometric, for example voice and/or face, print of the calling party can be placed into a black list of the called party, or associated with a lower confidence score than originally. This decision can also be used in the decision to reject future calls from the calling party to other called parties, or to ask this calling party to speak.

The process can use one modeling for authorized calling parties and another modeling for unauthorized calling parties. This modeling can be based both on the calling party number and on biometric analysis of the calling party. It may be individual for each called party. By way of example, an authorized calling party model for a given called party may contain the usual calling parties for this called party, while an unauthorized calling party model may contain calling parties on a black list along with those whose calling party number or voice analysis betray a call from a call center abroad. The modeling of the calling parties may also be collective and identical for all called parties.

The decision to accept a call and then to transmit it can be taken when the parameters of this call come sufficiently close to the authorized calling party model.

The decision to block a call will be taken when the parameters of this call come sufficiently close to the unauthorized calling party model.

An algorithm of machine learning type can be set up in order to classify incoming calls into the category of authorized or unauthorized calls.

BRIEF DESCRIPTION OF THE FIGURES

Exemplary implementations of the invention are indicated in the description illustrated by the appended figures, in which.

EXEMPLARY EMBODIMENT(S) OF THE INVENTION

FIGS. 1 to 4 illustrate four filtering system variants in a telecommunications network.

Figure 1:
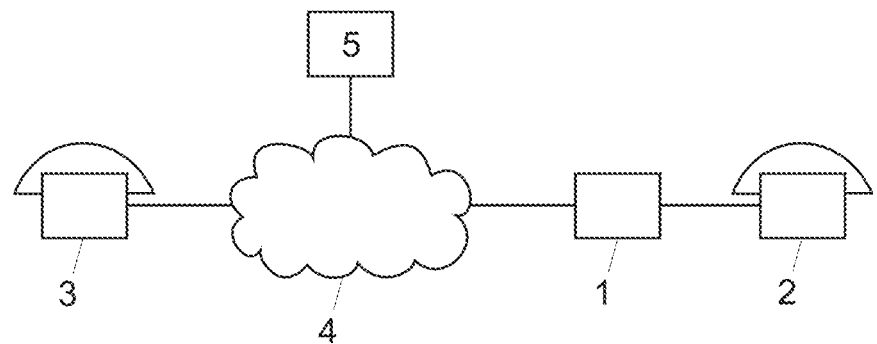
FIG. 1 illustrates a telecommunications network including a filtering system according to a first embodiment of the invention.

In the example of FIG. 1, the telecommunications network has a telephone network 4, for example an analog (POTS), ISDN, cellular or VoIP-type network, and/or a combination of several of these networks. The reference 3 corresponds to a terminal device of a calling party wishing to set up a telephone call to a terminal device of a called party 2 through this telephone network 4. In this case, the filtering system 1, 5 includes a module 1 in the form of a box connected between the called party terminal device 2 and the telephone network 4, for example on the phone jack of the terminal. Functionalities of the module 1 may also be provided by software. In one embodiment, this module is integrated in the called party terminal device 2, for example in the form of firmware or of an application, for example an application executed on top of an operating system in the case of a terminal device in the form of a cell phone, a tablet or a computer, in particular. The module 1 may contain a processor along with a personal database of calling party numbers, a personal database of calling parties and a personal database of biometric prints from the calling parties, for example voice and/or face prints. The databases of calling party numbers and calling parties indicate which numbers and which calling parties feature on black, white or gray lists, for example.

The filtering system 1, 5 moreover includes a server 5 accessible from the telephone network 4 and containing a processor along with a shared database of calling party numbers 50, a shared database of calling parties 51 and a shared database of biometric prints 52 from the calling parties, for example voice and/or face prints. The databases of calling party numbers and calling parties indicate which numbers and which calling parties feature on black, white or gray lists, for example.

The server 5 may also contain histories for past calls by various calling parties and/or to various called parties, voice and/or biometric and/or semantic signatures of calling parties, etc.

The server 5 may also be provided in the form of a virtual server or a group of interconnected servers, for example in the cloud. Other organizations may be imagined.

The filtering box 1 can connect to this server 5, for example by means of an integrated modem 10 making it possible to set up a data communication to this server, for example during an interval without dialog or in a frequency band that is not used for voice communication.

The configuration of FIG. 1 affords maximum installation convenience and saves the called party from the task of having to configure an internet connection; it is also appropriate when there is no available internet connection. Typically, all fixed and mobile telephones can thus be used by the invention. In this case, a single portion of the information is communicated by the telephone line or by the voice connection of the mobile telephone; typically, the voice of the presumed perpetrator of an abusive call. The majority of the processing of the modeling of speakers is performed on the device 1 itself. Spam modeling is itself also performed directly on the device 1.

Figure 2:
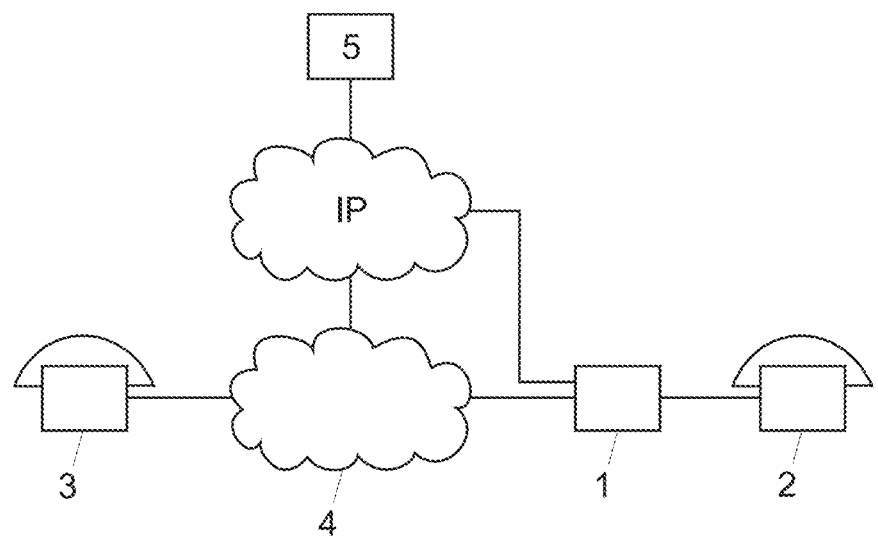
FIG. 2 illustrates a telecommunications network including a filtering system according to a second embodiment of the invention.

In the example of FIG. 2, the box 1 is connected to the server 5 through the IP internet network, for example through an internet interface of the box 1. The other elements may be identical to the corresponding elements of FIG. 1. The IP connection broadens the possibilities of use and improves use ergonomics. By way of example, it is possible to configure the filtering system via a web server, to store parameters in the server 5 (or in a cloud), and to share information with other users.

Figure 3:
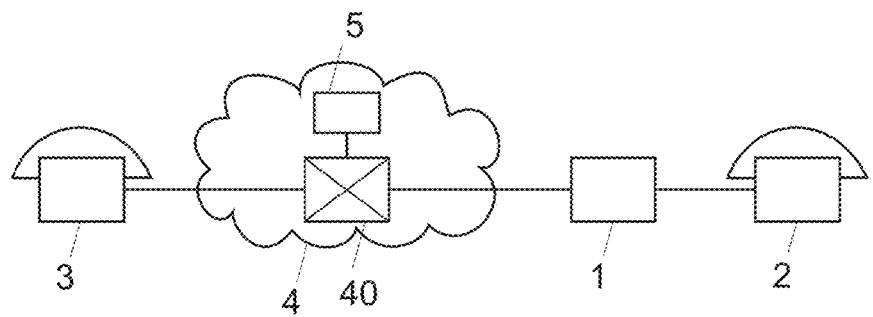
FIG. 3 illustrates a telecommunications network including a filtering system according to a third embodiment of the invention.

In the example of FIG. 3, the filtering system 5 is entirely integrated in the telephone network 40, for example in the form of a software and/or hardware module 5 that can be connected to a node 40 of the network, for example an SSF node of an intelligent network. The other elements may be identical to the corresponding elements of FIG. 1.

In this embodiment, the service can also be provided by diverting calls to the conventional telephone network or by diverting calls to another network of VoIP type. The user no longer needs to install a box on his premises and the interaction takes place by means of web access or using a software application on the Smartphone. The service can be managed by telephone operators or operators of voice services, social networks, etc.

Figure 4:
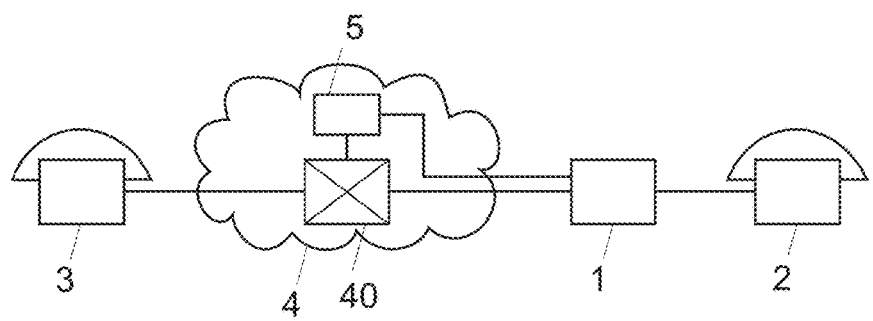
FIG. 4 illustrates a telecommunications network including a filtering system according to a fourth embodiment of the invention.

In the example of FIG. 4, the terminal device 2 of the called party is connected to the server 5 via a connection of internet type, so as to allow the called party to signal unwanted calls, for example. The other elements may be identical to the corresponding elements of FIG. 1 or of FIG. 3.

Figure 5:
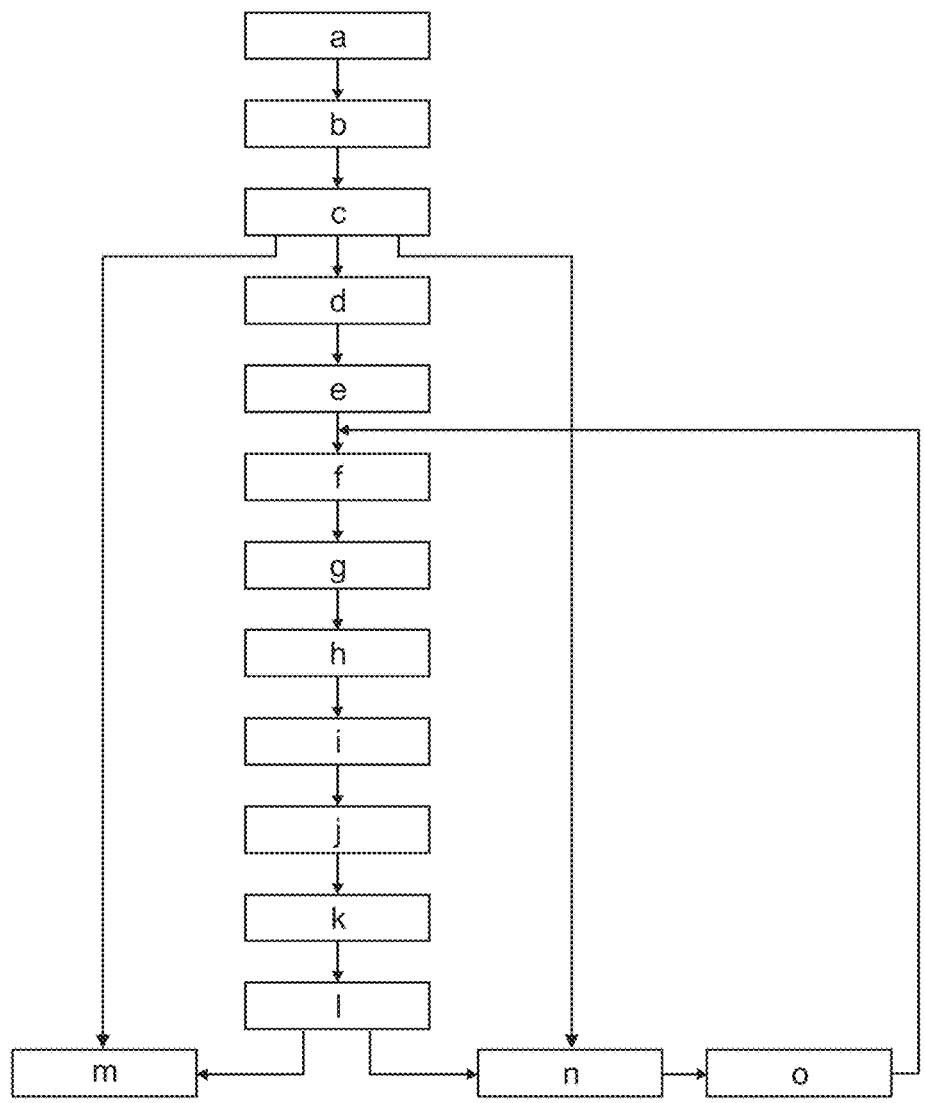
FIG. 5 is a flowchart illustrating an exemplary process according to the invention.

We will now describe an exemplary process implemented by the filtering system 1, 5 according to the invention in connection with FIG. 5.

In the course of step a, a telephone call from the telephone network 4 is received, and the calling party number (CLI—Caller Line Identity) is determined, for example in the device (or application) 1 if it is present, or in the server 5 in the embodiments of FIGS. 3 and 4. The call is intercepted and is not immediately transmitted to the terminal device 2, which therefore does not yet ring.

In the course of step b, the calling party number determined in this manner is analyzed. By way of example, this analysis may involve a comparison with a list of calling party numbers in a black list of unwanted calling party numbers, and/or a comparison with a list of calling party numbers in a white list of calling party numbers.

The comparison can be made with white and/or black lists individual to the called party, which may be stored locally in his device 1 or in a dedicated memory space of the server 5, for example; these local lists contain numbers that are unwanted (or acceptable) for a given called party but that are not necessarily so for another called party, for example. In addition, or alternatively, the comparison can be made with white and/or black lists that can be stored in a centralized manner in the server 5 and contain unwanted (or acceptable) calling party numbers for all or most of the called parties. Synchronization mechanisms can be set up in order to synchronize the local lists and the centralized lists; by way of example, a calling party number marked as unwanted in a number of devices 1 that is higher than a predetermined threshold, or in a predetermined percentage of devices 1, will be able to be incorporated into a centralized list in the server 5 automatically.

The calling party number analysis performed in the course of step b may also include a plausibility analysis for the calling party number, for example in order to exclude numbers whose format, number of digits or dialing code does not correspond to a possible number, or corresponds to a number in a block of prohibited numbers.

The calling party number analysis performed in the course of step b may include a check on the history of past calls from this number, which are stored in the server 5; thus, a calling party number associated with frequent calls during a brief interval will have a higher probability of being classified as unwanted than a calling party number used more conventionally.

The calling party number analysis performed in the course of step b may also include the search for this calling party number in telephone directories, on the web, for example by means of search engines, in a social network such as Facebook, Twitter, LinkedIn, etc., on a chat site, etc. and the search for a profile associated with this number in these different sources. These profiles, for example a company name, a company activity, a geographical location, are then used to compute a score or a probability of unwanted call. It is also possible to check whether one of these companies or activities is part of a white list or of a black list of companies or activities, for example if it is a company known for generating telephone spam. The score attributed to each company, to each activity or to each geographical location may be individual for each called party. This is because a called party who is active in a given field of activity, or lives in a given geographical location, is more likely to receive calls from companies in this field or close to this location than a called party who is active in another field or location. It is also possible to use an automatic learning algorithm, based on the past behavior of a called party, for example on calls accepted, on the length thereof, on calls marked as unwanted, in order to compute the individual score for this called party.

A calling party number associated with a company, or a type of company, that is known for its telephone harassment, will thus be associated with a high probability of being unwanted. A particular called party may also decide to block all incoming calls whose number is associated with insurance companies in a directory or on the web, for example.

The calling party number analysis can also resort to a specialized external certification entity, for example a PKI ("public-key infrastructure"), capable of certifying some calling party numbers.

In the course of step c (optional), a score is attributed to the call on the basis of the results of the calling party number analysis performed in the course of step b. This score is linked to the probability of the call being unwanted for the given called party 2.

If the score is lower than a first given threshold, then the incoming call is blocked (step m); optionally, a prerecorded or synthetically generated voice message can be reproduced for the calling party 3 in order to indicate to him that the call is denied. If, by contrast, this score is higher than a second given threshold (higher than the first threshold), then the call is transmitted to the device 2 (step n), which starts to ring (or to vibrate), so that the called party is able to answer. These safe calls are therefore set up in a manner that is entirely transparent to the calling party and to the called party.

If the score is between the first threshold and the second threshold, a particular procedure is set up, and illustrated by steps d to l in the figure. These steps are therefore carried out when the analysis of the calling party number does not allow said analysis alone to classify the call as a wanted call or as a call to be accepted unconditionally, for example in the case of an unknown telephone number or one for which no information is available.

The threshold levels 1 and 2 may optionally be adjusted by the user in order to adjust the level of false positives and false negatives.

In the course of step d, the calling party is asked to speak, for example by means of a voice prompt synthesized by the device 1 or by the server 5. By way of example, the calling party may be asked to say his name and the name of the person desired. The request can be reproduced so that the calling party can only realize that he is speaking to a voice dialog machine with difficulty.

In a variant, the call is interrupted before step d. The system then sets up a communication in the other direction, that is to say by calling back the calling party on the indicated calling party number, and asks the calling party to speak. This variant is more restricting, but it affords additional security by allowing the indicated calling party number to be checked.

In the course of step e, the calling party responds to the filtering system 1, 5, for example by saying his name and the person desired.

In the course of step f, the voice of the calling party is analyzed by the filtering system 1 or 5. The aim of this analysis is to classify the calling party as an unwanted person or otherwise. A voice extract of less than 30 seconds is generally sufficient.

In the case of multimodal communication, for example communication including the image in addition to the voice, it is optionally possible to also analyze the image of the calling party and to perform a facial analysis. Other biometric parameters can be used as well as the voice, including fingerprints if available, for example.

In the course of step g (optional), a semantic analysis of the voice of the calling party is performed, for example on the basis of a voice-to-text conversion of the words spoken by the calling party. The semantic print is dependent on all of the layers of the language: speech, pragmatics, semantics, syntax, lexical level. By way of example, it is possible to detect specific phrases, words or turns of phrase that are found most frequently in unwanted calls.

In the course of this step g, other information can be extracted from the audio signal received from the calling party. By way of example, many unwanted calls are generated from call centers that generate characteristic sound signals, for example audio beeps or other signals generated by the center. Some operators in call centers work to music; it is also not unknown for a musical introduction to be played as an introduction at the beginning of the call. Background noise, which is normally removed by voice or speaker recognition algorithms, may be of great interest because it allows a place, for example a call center, to be identified. Voice recognition systems can be trained specifically to recognize the background noise in some call centers, and/or the specific sound signals transmitted by some centers, for example. Echoes transmitted in the call room are also characteristic and are dependent on the geometry of the room. It is therefore possible to classify background noise and/or echoes during a call in order to determine whether it comes from a call center, or from a specific call center. Furthermore, some operators use synthetic voices or prerecorded voice extracts at the beginning of the call in order to reduce the workload of the operators. These extracts can be recognized. A module for detecting a synthetic voice, for example a module based on measurement of the rhythm of the voice, can be used. These parameters, individually or in combination, constitute an acoustic print for the calling party. They can be used to determine a score or a probability for an unwanted call.

In the course of step h (optional), the calling party is modeled on the basis of his voice and this semantic analysis. This step makes it possible firstly to create a voice signature for the calling party, in order to recognize him on subsequent calls, and secondly to compare him with preexisting models for unwanted users and acceptable users. This modeling can include detection of the language spoken by the calling party, for example; it is thus possible to associate a score dependent on this language. The model can also indicate emotional characteristics of the calling party (for example a stressed state, an aggressive tone, business language, etc.). The model may also include a determination of the approximate age of the calling party, and of his sex. All of these parameters of the model can be used to later compute, in the course of step k, a score attributed to the calling party and linked to the probability of this calling party being unwanted.

In the course of step i, the calling party is identified on the basis of voice analysis. The identification can use speaker recognition algorithms and/or voice recognition algorithms in order to identify the calling party on the basis of his words.

The identification corresponds to a determination of the identity of the calling party, for example in the form of a unique identifier such as a name, a number, etc. The identification can make use of the calling party number previously determined in the course of step a; however, multiple calling parties can share one and the same calling party number, and a calling party can use different calling party numbers on different occasions. This calling party identification therefore allows a distinction to be drawn between the various members of a family or of a company using the same telephone line and the same calling party number, for example.

Alternatively, or additionally, step i can also include an authentication (or check) of the calling party in order to check whether he actually corresponds to the indicated calling party number, to the identity claimed in his voice response and/or to a claimed calling party group. By way of example, the authentication can consist in checking whether the voice and/or face signature of the calling party belongs to the group of users that share a calling party number or a group of calling party numbers.

In one option, the algorithm models in a combined manner (multimodal recognition of speakers) by using, by way of example, the consistency of the 3D representation of the face with the visemes for the word being said.

Alternatively, or additionally, step i may also include a classification of the calling party among predetermined calling party groups. By way of example, this classification may be based on models of predetermined calling party groups. In one embodiment, at least one first model is set up to model unwanted calling parties and at least one second model is set up to model accepted calling parties. The classification can then involve a computation of the distance between the calling party model determined in the course of step h and these two predetermined calling party models in order to classify the new calling party into one or the other class.

The classification can also involve a classification into a group of strangers, that is to say a group combining all speakers outside the set of N identifiers of the calling parties known by the system.

Known Machine Learning automatic learning technologies can be used for this classification (GMM, Bayesian network, Support Vector Machine) by using both biometric and textual/semantic parameters.

Biometric modeling algorithms that are independent of the uttered text and that do not reveal content of the text can also be used, for example in an approach that is respectful of private life and in order to avoid an analysis of the content of conversations. Approaches that are dependent on the text and that involve a voice-to-text conversion generally have greater reliability, however.

Data associated with the previously identified calling party can be checked in the course of optional step j. By way of example, data associated with this calling party and stored in the device 1, in the server 5 or in databases or external websites can be used. In one embodiment, data relating to this calling party are extracted from directories or from social networks and can be used to attribute a score to this calling party in the course of step 1.

In the course of optional step k, data associated with the called party can be checked, for example data entered for this purpose by the called party himself into the device 1, into the server 5, into a dedicated website, on a social network site, a chat site, etc. These data can include lists of denied called parties, characteristics of denied called parties (for example on the basis of language, age, sex, etc.) or points of interest or characteristics of the called party, for example. It is thus possible to check any correlation between these data belonging to the called party and the data belonging to the calling party, along with the semantic content of the words spoken by the calling party.

In the course of step 1 (optional), a score is attributed to the calling party on the basis of the results from steps f to k. This score is linked to the probability of the calling party being unwanted for the given called party 2. It may be combined with the telephone number score determined in the course of step c so as to compute a combined score.

If the score is lower than a third given threshold, then the incoming call is blocked (step m); as an option, a prerecorded or synthetically generated voice message can be reproduced for the calling party 3 in order to indicate to him that the call is denied. If, by contrast, this score is higher than a fourth given threshold (higher than the first threshold), then the call is transmitted to the terminal device 2 (step n), which begins to ring (or to vibrate), so that the called party can answer.

When the call is set up in the course of step n, the calling party and the called party can converse normally. However, the called party can signal at any time, in the course of step o, that the calling party is unwanted, for example by pushing a button on the module 1, by means of a voice command, etc. In this case, the call is interrupted and the calling party number along with the voice or biometric signature of the calling party are recorded as unwanted in the personal black list of the called party.

In the course of the dialog between the calling party and the called party, the voice and semantic analysis of the words of the calling party continues (steps f to l), and the score is continually recomputed; the conversation can thus be automatically interrupted by the system 1, 5 if this score drops below a given value. In a variant, the filtering system only suggests interrupting the conversation to the called party, for example by means of a visual message displayed on a Smartphone or on a screen of the module 1, or by means of a reproduced voice message. The decision to interrupt the conversation, or to suggest such an interruption, may also be dependent on an analysis of the emotions in the voice of the calling party and/or of the called party, and on a semantic analysis of the dialog.

This analysis on the fly, in the course of the conversation, also allows the voice and semantic model of calling parties to be improved.

If the terminal device 2 is constituted by a Smartphone, a tablet or a computer, the confidence that the system places in the call or in the authenticity of the conversation can be continually visualized on the screen or by calling on the functionalities of the system used (vibrate facility, audible notification, etc.).

In the case of an asymmetric Smartphone-to-telephone communication, the biometric parameters of the calling party can, all the same, include visual modeling of the calling party that is performed on the Smartphone. The parameters are then transmitted by another network connection to the filtering system 1, 5.

The system moreover affords the advantage of saving the biometric data of the calling party, for example his voice and/or face print. The perpetrators of criminal or unwanted calls leave their biometric traces behind them, and these data can be shared with the other members of the community of users of the system, or with the police. The biometric system can thus benefit and model these persons.

We will now describe an exemplary dialog in a system according to the invention. The system calls on a device that appears under the name of Katia. In this scenario, the calling party 3 is Alice and the called party 2 is Bob.

In this example, the dialog is initiated by Alice, who dials the number of the called party Bob. Bob has installed a filtering box "Katia" 1 between his terminal 2 and the telephone network 4, which intercepts this incoming call. Alternatively, Bob has installed an application on his Smartphone that intercepts this incoming call.

The system 1, 5 detects that the score associated with the number is below the first confidence threshold. In this case, the system picks up the call instead of Bob and performs a nontransparent access check for the calling party. More precisely, the box 1 picks up with the following message: Your number is not recognized by Katia, and the remainder of the conversation will be recorded; if you do not wish to be recorded, hang up now. Katia is listening!

Such a message itself often has the effect of dissuading unwanted or criminal calling parties if they find that their call is recorded.

Alice answers with the phrase: Hello, Katia, I am calling from New York. I need Bob's help; can you put me through to him?

The system 1, 5 recognizes Alice by courtesy of the voice print stored and also by courtesy of the semantic print created by the Facebook page where Alice had described her trip to New York. With a favorable result from the probability computation (score of the telephone number combined with the probabilities that result from the check on the prints), the system grants access and rings Bob's telephone. Hold music is reproduced for Alice while she waits for Bob to answer.

Access is then granted by Bob, who picks up. In a preferred embodiment, Bob has listened to the message from Alice that is reproduced for him, which allows manual filtering by Bob. Bob can communicate his decision to take the call to the device 1, for example with a voice command of the type "Katia, I will take the call". The communication is then set up between Alice and Bob.

Alice then speaks to Bob. In this example, she asks "Hello, Bob, can you send some money to my account? It's urgent!". The system 1, 5 records the conversation and splits up the speech of each speaker. The semantic print of Alice is analyzed continuously in order to check spam. Bob answers and the conversation continues.

Alice then ends her call. The filtering system 1, 5 updates the voice, biometric and semantic models of the calling party Alice.

The present invention also concerns a tangible computer data storage medium containing a program that can be executed by a computer system 1, 5 in order to perform all or some of the process above.

The invention claimed is:

1. A process for filtering, by use of a filtering system, unwanted incoming telephone calls from a calling party terminal device to a called party terminal device through a telephone network, the filtering system comprising a module connected between the called party terminal device and the telephone network, the method comprising:
   determining, on said module or on a server of the filtering system that is connected to said module via the telephone network or a connection, a calling party number of a received call from the calling party terminal device and destined to the called party terminal device;
   attributing, on said module or on said server, a confidence score to the calling party number;
   based on a first confidence score attributed to the calling party number, transmitting, by using said module, the call to the called party terminal device,
   based on a second confidence score attributed to the calling party number, rejecting, by using said module, the call,
   based on a third confidence score attributed to the calling party number, asking, by using said module or said server, a calling party employing the calling party terminal device to speak on the calling party terminal device; wherein the third confidence score is different of the second confidence score;
   when, based on the third confidence score, the calling party is asked to speak, analyzing, on said module or on said server, the voice of the calling party without transmitting said voice to the called party terminal device; and
   based on the analysis of the voice of the calling party, transmitting, by using said module, the call to the called party terminal device, or blocking, by using said module, the call without transmitting the call to the called party.

2. The process as claimed in claim 1, further comprising, on said module or on said server, an analysis of the face of the calling party.

3. The process as claimed in claim 1, wherein the analyzing of the voice of the calling party continues after the call has been transmitted to the called party, wherein the call is blocked or blockable when the continued analysis shows that the call is unwanted.

4. The process as claimed in claim 1, further comprising, on said module or on said server, deciding to call back the calling party in order to check the calling party number and asking the calling party to speak.

5. The process as claimed in claim 3, comprising a step in the course of which the called party signals an unwanted call, this indication then being used in the decision to reject future calls from the calling party to other called parties, or to ask this calling party to speak.

6. The process as claimed in claim 3, comprising a step of semantic analysis, on said module or on said server, of the conversation, wherein the decision to transmit a call or the decision to block a call is dependent on this semantic analysis.

7. The process as claimed in claim 6, the decision to transmit a call or the decision to block a call on the basis of the semantic analysis being dependent on each called party.

8. The process as claimed in claim 3, comprising a step of analysis of the background noise, of the echoes, of the music and/or of the sound signals transmitted by the calling party, the decision to transmit a call or the decision to block a call being dependent on this analysis.

9. The process as claimed in claim 3, comprising a step of modeling, on said module or on said server, of the authorized calling parties, along with a step of modeling of the unauthorized calling parties.

10. The process as claimed in claim 3, in which said decision to transmit the call, to reject the call, or to ask the calling party to speak is based on a machine learning method.

11. The process as claimed in claim 1, in which said filtering system performs a plausibility analysis for the calling party number and takes this plausibility analysis into account in its decision either to transmit the call, or to reject the call, or to ask the calling party to speak.

12. A process for filtering, by use of a filtering system, an unwanted incoming telephone calls from a calling party terminal device to a called party terminal device through a telephone network, the filtering system comprising a module connected between the called party terminal device and the telephone network, the method comprising:
   determining, on said module or on a server of the filtering system that is connected to said module via the telephone network or a connection, a calling party number of a received call from the calling party terminal device and destined to the called party terminal device;
   attributing, on said module or on said server, a confidence score to the calling party number;
   based on a first confidence score, transmitting, by using said module, the call to the called party terminal device;

based on a second confidence score, rejecting, by said
module, the call;
based on a third confidence score, asking, by using said
module or said server, a calling party employing the
calling party terminal device to speak on the calling
party terminal device;
when, based on a third confidence score, the calling party
is asked to speak, analyzing, on said module or on said
server, the voice of the calling party; and
based on the analysis of the voice of the calling party,
transmitting, by using said module, the call to the called
party terminal device, or blocking, by using said module, the call without transmitting the call to the called
party,
wherein said confidence score attributed to the calling
party: is dependent on the called party, is based on said
voice analysis, or depends on a history of calls made by
said calling party being identifying with said voice
analysis.

13. A process for filtering, by use of a filtering system, an unwanted incoming telephone calls from a calling party terminal device to a called party terminal device through a telephone network, the filtering system comprising a module connected between the called party terminal device and the telephone network; the method comprising:
   determining, on said module or on a server of the filtering system that is connected to said module via the telephone network or a connection, a calling party number of a received call from the calling party terminal device and destined to the called party terminal device;
   attributing, on said module or on said server, a confidence score to the calling party number;
   based on a first confidence score, transmitting, by using said module, the call to the called party terminal device,
   based on a second confidence score, rejecting, by using said module, the call;
   based on a third confidence score, asking, by using said module or server, a calling party employing the calling party terminal device to speak on the calling party terminal device;
   when, based on a third confidence score, the calling party is asked to speak, analyzing, on said module or on said server, the voice of the calling party; and
   based on the analysis of the voice of the calling party, transmitting, by using said module, the call to the called party terminal device, or blocking, by using said module, the call without transmitting the call to the called party,
   wherein the process further comprises making, on said module or on said server, a decision to reject the call or to ask the calling party to speak based on the confidence score, and
   wherein said decision to reject the call or to ask the calling party to speak being dependent on:
      a history of calls made with said calling party number to other called parties; or
      data of a profile of the calling party in a directory, on the web and/or in a social network, said profile being checked by using said module or said server.

14. A process for filtering, by use of a filtering system, an unwanted incoming telephone calls from a calling party terminal device to a called party terminal device through a telephone network, the filtering system comprising a module connected between the called party terminal device and the telephone network; the method comprising:
   determining, on said module or on a server of the filtering system that is connected to said module via the telephone network or a connection, a calling party number of a received call from the calling party terminal device and destined to the called party terminal device;
   attributing, on said module or on said server, a confidence score to the calling party number;
   based on a first confidence score, transmitting, by using said module, the call to the called party terminal device;
   based on a second confidence score, rejecting, by using said module, the call;
   based on a third confidence score, asking, by using said module or server, a calling party employing the calling party terminal device to speak on the calling party terminal device;
   when, based on a third confidence score, the calling party is asked to speak, analyzing, on said module or on said server, the voice of the calling party;
   based on the analysis of the voice of the calling party, transmitting, by using said module, the call to the called party terminal device, or blocking, by using said module, the call without transmitting the call to the called party; and
   authenticating said calling party by said voice analysis and checking if said authentication corresponds to the calling party number.

* * * * *